Figure 1:
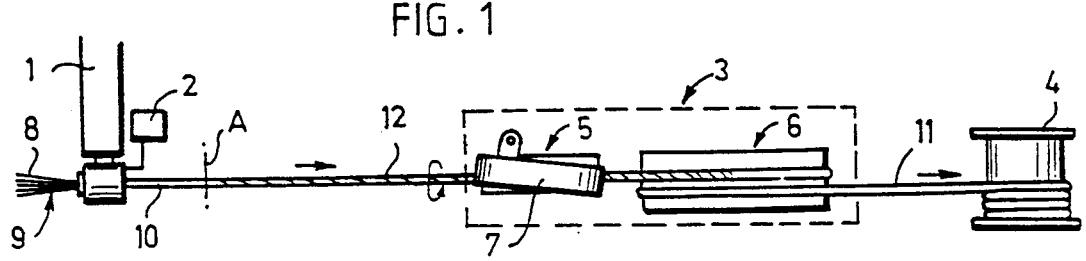

United States Patent [19]
Päivinen et al.

[11] Patent Number: 5,102,584
[45] Date of Patent: Apr. 7, 1992

[54] METHOD OF AND APPARATUS FOR PRODUCING AN OPTICAL MULTI-FIBRE CABLE ELEMENT

[75] Inventors: Teuvo Päivinen, Lahela; Jouko Heikkilä, Helsinki, both of Finland

[73] Assignee: Nokia-Maillefer Holding S.A., Ecublens, Switzerland

[21] Appl. No.: 597,680

[22] Filed: Oct. 16, 1990

[30] Foreign Application Priority Data

Oct. 20, 1989 [FI] Finland .............................. 895002

[51] Int. Cl.⁵ .............................................. B29D 11/00
[52] U.S. Cl. .................................... 264/1.5; 57/7; 57/297; 65/3.11; 65/4.2; 65/4.21; 264/174
[58] Field of Search ............... 65/3.11, 4.21, 4.2; 264/1.5, 174; 57/7, 9, 297

[56] References Cited
U.S. PATENT DOCUMENTS

| | | | |
|---|---|---|---|
| 4,205,899 | 6/1980 | King et al. | 264/1.5 X |
| 4,446,686 | 5/1984 | Panuska et al. | 57/7 X |
| 4,458,476 | 7/1984 | Mayr et al. | 57/7 X |
| 4,772,435 | 9/1988 | Schlaeppi et al. | 264/1.5 |

*Primary Examiner*—Robert L. Lindsay
*Attorney, Agent, or Firm*—Finnegan, Henderson, Farabow, Garrett & Dunner

[57] ABSTRACT

A method of producing an optical multi-fibre cable element provided with a secondary sheathing by extruding (1) a loose secondary sheathing (10) around a fibre bundle (9) and providing the fibres with a desired extra length with respect to the secondary sheathing. To avoid variation in fibre length in the production of cable elements the secondary sheathing (10) together with the fibre bundle (9) is twisted (12) around its axis after the extrusion step (1) at least to such an extent that the longitudinal sliding of the fibres with respect to each other is prevented in the twisted fibre bundle and that the stretching of the fibres in the fibre bundle at the step of providing the extra length (3; 18) is kept within the elastic range of the fibres. In an apparatus suitable for realizing the method, twisting means (7) are provided after the extruder and before the device providing the extra length, which twisting means twist the secondary sheathing and the fibre bundle in such way that the fibres are locked together.

9 Claims, 2 Drawing Sheets

METHOD OF AND APPARATUS FOR PRODUCING AN OPTICAL MULTI-FIBRE CABLE ELEMENT

This invention relates to a method of producing an optical multi-fibre cable element provided with a secondary sheathing, comprising extruding a loose secondary sheathing around a fibre bundle of several optical fibres;

introducing a grease filling into the secondary sheathing, said grease filling allowing the fibres to move axially with respect to each other within the secondary sheathing;

providing the fibres with a desired extra length with respect to the secondary sheathing; and reeling a secondary-sheathed cable element so obtained onto a receiving reel.

In the production of a cable element comprising an optical fibre, it is important that the length of the fibre is made greater than that of the sheathing in the secondary sheathing step in order that the fibre would not be exposed to disadvantageous strains when the cable element is bent on reeling or installation.

Finnish Patent Specification 75 939 discloses one simple way of providing an extra length by stretching the secondary sheathing with a stretching device, whereby the optical fibre remains longer when the sheathing returns to its original length after the stretching. The stretching device comprises a drawing means which draws the sheathing loosely surrounding the fibre from an extruder, and a locking wheel assembly comprising an idler wheel around which the sheathing together with the fibre is passed at a speed slightly greater than at the drawing means. In the locking wheel assembly the fibre is positioned against the inside of the sheathing, so that the sheathing is stretched between the drawing means and the locking wheel while the fibre slides axially with respect to the sheathing.

In optical cable elements in which the secondary sheathing surrounds a fibre bundle of several fibres, the provision of an extra fibre length using a stretching device of the type described above causes variation in the length of the fibres as the turning radius of the fibres around the idler wheel of the locking wheel assembly varies. This is because the fibres which are passed through the extruder in parallel with each other are always passed onto the periphery of the idler wheel in the same order with respect to each other, that is, the same fibres are always positioned against the peripheral surface of the idler wheel, whereas the other fibres are always positioned upon the first-mentioned fibres, and as a consequence have a greater turning radius. As is well-known, such variation in the fibre length causes various disadvantages in the cable element.

U.S. Pat. No. 4,458,476 teaches one way of avoiding the problems caused by such variation in the fibre length in multi-fibre cable elements. In the U.S. Patent, fibres in the fibre bundle are SZ twisted before the extrusion of the loose secondary sheathing around the fibres and before the sheathing is filled with grease, the purpose of the grease being to prevent a twisted fibre from being untwisted before the fibre bundle is surrounded with a sheathing. In the secondary-sheathed cable element the fibres remain twisted to some extent, which ensures that the fibres have a greater length than the sheathing. However, the twisting device required for realizing this kind of method makes the secondary sheathing device complicated, long and slow. In addition, it is known that a few major disadvantages are caused by the twist remaining in the finished cable element. The SZ twisting creates a torque in the fibres, which results in the formation of static strains. The middle rod around which the fibres are twisted brakes the sliding of the fibres, thus increasing friction and strains, whereby the differences between the strains of different fibres are increased with resultant variation in the fibre lengths and impairment of the technical properties of the cable element.

U.S. Pat. No. 4,205,899 teaches that the extra length of the fibres can be provided by passing the individual fibres in the fibre bundle into the extruder in a wavelike manner, whereby the fibre length in the secondary-sheathed fibre bundle is greater than the length of the sheathing. Due to the spiral-grooved spindle and the fibre control means required for realizing this method as well as the twist remaining in the fibres, this method has substantially the same disadvantages as the above-described SZ twisting method.

Finnish Patent Specification 75 940 teaches that the fibres in the fibre bundle will not be passed into the idler wheel assembly of the stretching device always in the same order with respect to each other when the order of the individual fibres in the fibre bundle which is passed into the extruder for providing it with a secondary sheathing is varied repeatedly in the step of forming the fibre bundle. In this way it is ensured that the fibres in the sheathed fibre bundle are passed into the idler wheel assembly in a continuously changing order, which compensates for the variation in the fibre length and improves the properties of the cable element. The device required for realizing the method, i.e. for varying the order of the fibres, makes the sheathing equipment relatively complicated and expensive.

The object of the present invention is to provide a method for the production of an optical multi-fibre cable element, which avoids the above-mentioned disadvantages and enables the fibres in the fibre bundle to be passed in parallel with each other into the extruder without any risk of the stretching device causing variation in the length of the fibres in the secondary-sheathed fibre bundle. This object is achieved by means of the method of the invention which is characterized in that the secondary sheathing with its fibre bundle is twisted around its axis after the extrusion step at least to such an extent that the longitudinal sliding of the fibres with respect to each other is prevented in the twisted fibre bundle and that the stretching of the fibres in the fibre bundle at the step of providing the extra length is kept within the elastic range of the fibres.

The invention is based on the idea that the measures to be taken to avoid variation in the fibre length in the sheathed cable element are carried out only after the extrusion of the secondary sheathing and that the fibres are allowed to enter the stretching device providing the extra length always in the same order with respect to each other (in the same twisting position) while ensuring that the fibre/fibres all the time moving with a greater turning radius than the other fibres on the periphery of the idler wheel of the stretching device is/are forced to stretch elastically so that they return to the same length as the other fibres after the stretching device. This makes it possible to twist the fibre bundle together with the secondary sheathing in such a way that the fibres are locked together in the bundle and are not able to slide in the longitudinal direction with respect to each other. The locking of the fibre bundle causes the topmost fibre(s) on the periphery of the idler wheel to be stretched. By keeping the stretching within the elastic range of the fibre, the stretched fibre returns to its original length after the stretching device, so that any variation in the fibre length of the finished sheathed cable element is avoided.

The invention is also concerned with an apparatus for realizing the method described above. The apparatus comprises an extruder for extruding a secondary sheathing loosely around a fibre bundle of several optical fibres;

means for feeding a grease filling into the secondary sheathing, stretching means for providing the fibres with a desired extra length with respect to the secondary sheathing; and transferring means for passing the fibres into the stretching means providing the extra length.

The apparatus is characterized in that the transferring means for the fibres are formed by twisting means positioned after the extruder, said twisting means being arranged to twist the secondary sheathing and the fibre bundle within it around the axis of the sheathing in such a way that the fibres are locked longitudinally unslidably together in the twisted fibre bundle.

The apparatus of the invention is very simple in structure because the invention can be realized simply by modifying the existing drawing means of a stretching device comprising a drawing means and an idler wheel in such a way that it subjects the fibres in the secondary-sheathed fibre bundle to a locking twisting effect. The invention does not either restrict the line speed in any way, and it can be applied both in horizontal and vertical lines.

When applying the invention in a so-called thermal biasing process (e.g. U.S. Pat. No. 4,772,435), one only has to provide a simple twisting means between the extruder of the secondary sheathing and the locking idler wheel to subject the sheathing to a locking twisting effect.

Figure 3:
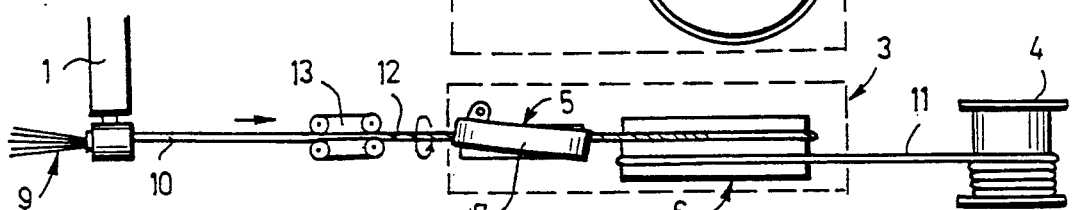
Figure 4:
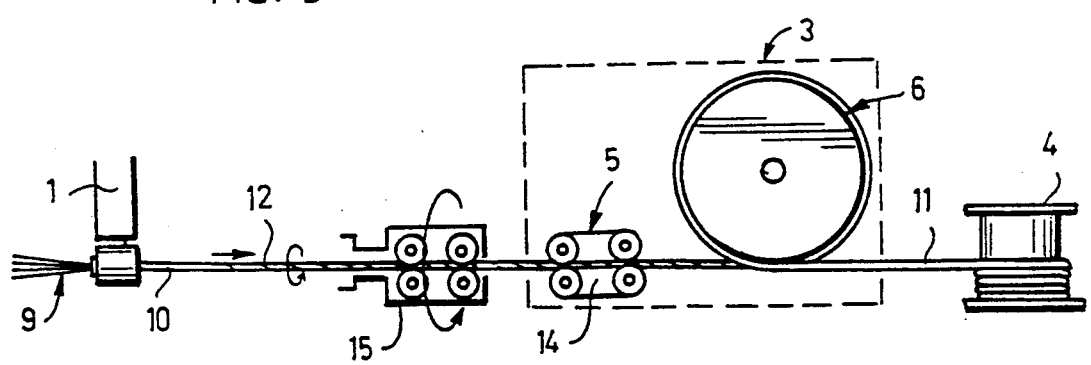
Figure 5:
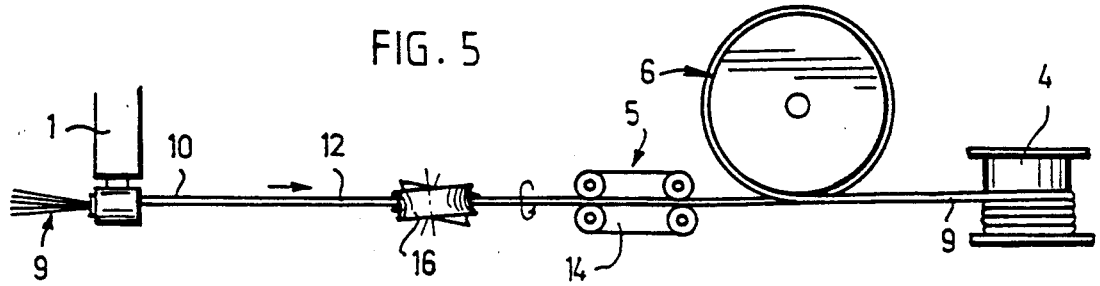
Figure 6:
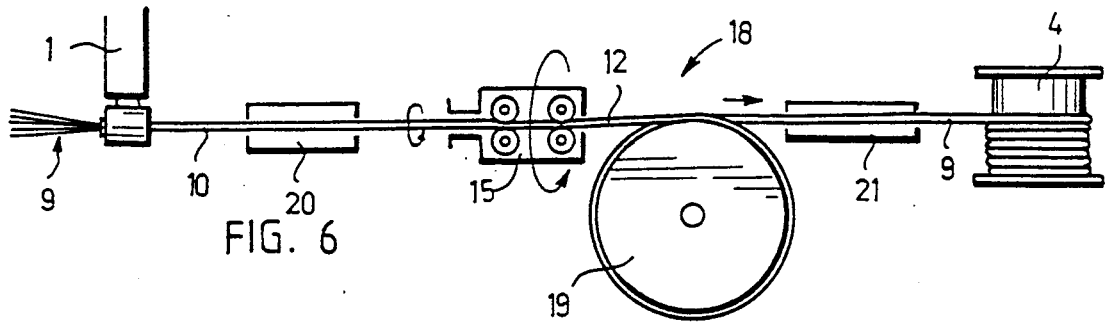
Figure 7:
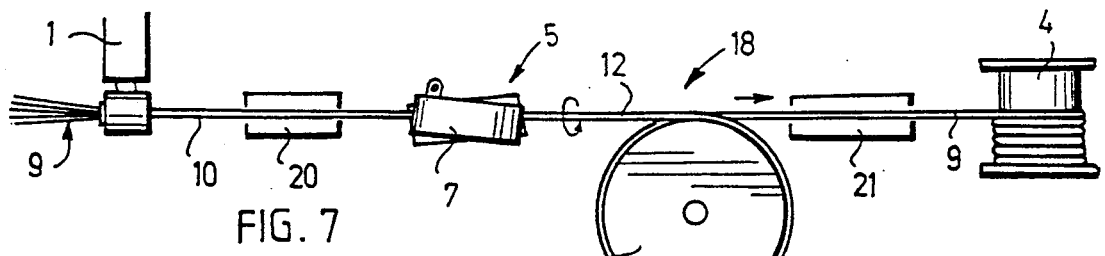
Figure 8:
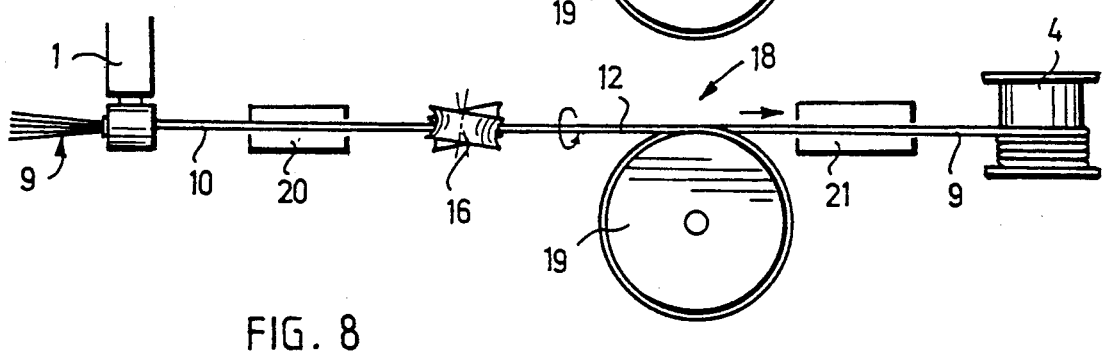

In the following the invention will be described in greater detail with reference to the attached drawings, in which FIG. 1 is a schematic top view and FIG. 2 a schematic side view of the first embodiment of the production apparatus of the invention when applied to the use of a twisting caterpillar in connection with a mechanical stretching device;

FIGS. 3 through 5 show alternative embodiments of the apparatus similarly in connection with a stretching device; and FIGS. 6 through 8 show alternative embodiments of the invention in connection with thermal biasing.

For the sake of clarity, all devices and means which are not necessary for the understanding of the invention, such as fibre feeding reels, cooling chutes for the secondary sheathing, etc., are not shown in the drawings.

Figure 2:
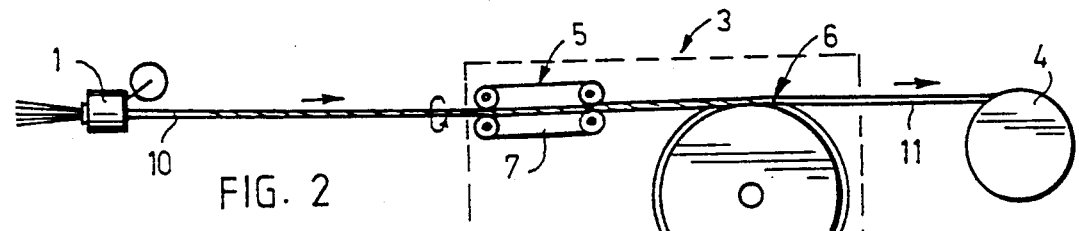

FIGS. 1 and 2 of the drawings show an extruder 1, an associated grease filling device 2, a stretching device 3 and a receiving reel 4. The stretching device comprises a drawing means 5 and a idler wheel 6 the operating machineries of which are synchronized with each other in a known manner with a small speed difference.

According to the invention, the drawing means 5 of the stretching device is formed by a twisting caterpillar 7 one drive belt of which is positioned slightly obliquely with respect to the other belt. The angular position of the drive belts can be adjusted in such a manner that the pitch of the twist of the fibre can be varied.

To sheathe a fibre bundle 9 consisting of parallel fibres 8, it is passed through an extruder which forms a loose secondary sheathing 10 around the fibre bundle, and the sheathing is filled with grease. The drawing means draws the fibre through it and at the same time twists the sheathing around its axis, whereby the grease filling forces the fibre bundle to follow the twisting movement of the sheathing. The angular position of the drive belts of the drawing means is adjusted so that the sheathing with the fibre bundle is twisted to such an extent that the fibres are locked together and are not able to slide with respect to each other. The fibre bundle, however, is still able to slide as a whole in the longitudinal direction with respect to the sheathing. The sheathing then passes around the idler wheel 6 and further onto the receiving reel. On the periphery of the idler wheel, the fibre bundle is positioned against the inside of the sheathing so that the fibre bundle is locked axially immovably to the sheathing. As the drawing means simultaneously brakes the movement of the sheathing to some extent, the sheathing is stretched between the drawing means and the idler wheel while the fibres slide axially in the grease within the area of the drawing means braking the sheathing. After the stretch of the sheathing has returned after the idler wheel, the resulting cable element 11 to be reeled is in this way provided with an extra fibre length with respect to the sheathing.

The fibre bundle twisted by the twisting caterpillar 5 starts to untwist after the drawing means, being substantially untwisted when it reaches the idler wheel so that the fibres are passed onto the periphery of the idler wheel substantially in parallel with each other and always in the same order with respect to each other. As the fibres of the fibre bundle are locked together by means of the caterpillar 5, the topmost fibre on the periphery of the idler wheel is not able to slide with respect to the other fibres but stretches on the idler wheel. When the conditions are adjusted so that the stretching takes place within the elastic range of the fibre, the stretch of the fibre will be restored after the idler wheel when the drawing effect no longer acts on the fibre. In this way, it is ensured that all fibres are of equal length after the stretching of the sheathing even though the paths of the fibres are of different length on the periphery of the idler wheel.

EXAMPLE

The inner and outer diameter of a plastic pipe forming the secondary sheathing of an optical 6-fibre cable element were 2.4 mm and 3.5 mm, respectively, and the outer diameter of primary-sheathed fibres was 0.25 mm. The secondary-sheathed fibre bundle was passed around an idler wheel having a diameter of 500 mm. When the fibres of the fibre bundle were locked with a twisting caterpillar, a stretch of 0.2% was formed in the topmost fibre on the idler wheel. The greatest allowable elastic stretch of the fibre material was between 0.7 and 1.0%.

In the embodiment of FIGS. 1 and 2, a twist 12 created in the sheathing by the twisting caterpillar 7 advances towards the extruder. In this case, it is advantageous to adjust the twisting effect of the caterpillar so that the twist does not extend beyond a solidification limit A of the sheathing to prevent the formation of a permanent twist in the sheathing and in the fibres. Such a permanent twist, however, is not disadvantageous because the sheathing is not in a strained state. A small twist gives firmness to the fibre bundle, wherefore a small permanent twist can be left in the sheathing in some cases.

The apparatus shown in FIG. 3 deviates from that shown in FIGS. 1 and 2 mainly in that a double belt device 13 preventing the twisting of the sheathing is mounted in front of the twisting caterpillar on the side of the extruder. In this way it can be accurately determined how far towards the extruder the twist created by the twisting caterpillar extends.

The apparatus shown in FIG. 4 deviates from that shown in FIGS. 1 and 2 in that the drawing means 5 of the stretching device is an ordinary caterpillar 14 which does not cause twisting. The sheathing is twisted by means of a twisting wheel assembly 15 mounted in front of the caterpillar.

The apparatus shown in FIG. 5 deviates from that shown in FIG. 4 merely in that the twisting wheel assembly 15 is replaced with a twisting wheel pair 16.

In the apparatuses shown in FIGS. 6 to 8 the extra fibre length of the finished cable element is achieved by so-called thermal biasing in place of the stretching device. Accordingly, the sheathing is exposed to a controlled shrinking effect 18 by means of a locking drive wheel 19 and cooling basins 20, 21.

In the apparatus shown in FIG. 6, a rotating twisting wheel assembly 15 is mounted in front of the locking drive wheel 19. The rotating twisting wheel assembly twists the sheathing and the fibre bundle before the fibre bundle is passed onto the periphery of the locking drive wheel.

In the apparatus shown in FIG. 7, a twisting caterpillar 17 is mounted in front of the locking drive wheel 19.

In the apparatus shown in FIG. 8, a twisting wheel pair 16 is mounted in front of the locking drive wheel 19.

The drawings and the description related to them are only intended to illustrate the idea of the invention. In their details, the method and the apparatus of the invention may vary within the scope of the claims.

We claim:

1. A method of producing an optical multi-fibre cable element provided with a secondary sheathing, comprising:
   extruding a loose secondary sheathing around a fibre bundle of several untwisted optical fibers;
   introducing a grease filling into the secondary sheathing, said grease filling allowing the fibres to move axially with respect to each other within the secondary sheathing;
   twisting the fibre bundle together with the secondary sheathing about its axis;
   providing the fibres with a desired extra length with respect to the secondary sheathing, said providing step including the step of stretching the fibres relative to the secondary sheathing;
   allowing the fibre bundle and secondary sheathing to untwist; and
   reeling the untwisted secondary-sheathed cable element so obtained onto a receiving reel, wherein the secondary sheathing together with its fibre bundle is twisted around its axis by said twisting step at least to such an extent that the longitudinal sliding of the fibres with respect to each other is prevented in the twisted fibre bundle, and wherein the stretching of the fibres in the fibre bundle in the step of providing the extra length is kept within the elastic range of the fibres.

2. The method according to claim 1, wherein the secondary sheathing together with its fibre bundle is always twisted in the same direction.

3. The method according to claim 2, wherein the secondary sheathing together with its fibre bundle is twisted following solidification of the extruded sheathing to enable the cable element to be substantially untwisted.

4. An apparatus for producing an optical multi-fibre cable element provided with a secondary sheathing, comprising:
   an extruder for extruding a secondary sheathing loosely around a fibre bundle of several untwisted optical fibres;
   means for feeding a grease filling into the secondary sheathing;
   stretching means positioned downstream of said extruder for providing the fibres with a desired extra length with respect to the secondary sheathing; and
   transferring means for passing the fibres into the stretching means, wherein the transferring means for the fibers comprise twisting means positioned after the extruder, said twisting means being arranged to twist the secondary sheathing and the fibre bundle within it around the axis of the sheathing for holding the fibres relatively longitudinally unslidably together in the twisted fibre bundle.

5. The apparatus according to claim 4, wherein said means for providing the extra length comprises a transferring means for transferring the secondary sheathing in the axial direction and a subsequent means for locking the sheathing and the fibre bundle axially immovably together, wherein the transferring means is a twisting caterpillar which twists the fiber bundle and the axially movable secondary sheathing around its axis.

6. The apparatus according to claim 5, wherein a means for preventing the secondary sheathing from being twisted around its axis on the side of the extruder is provided upstream of the caterpillar.

7. The apparatus according to claim 4, wherein said means for providing the extra length comprises a means for transferring the secondary sheathing in the axial direction and a subsequent means for locking the sheathing and the fibre bundle axially immovably together, wherein the transferring means is a non-twisting caterpillar and that means for twisting the fibre bundle and the axially movable sheathing around its axis are provided upstream of said non-twisting caterpillar.

8. The apparatus according to claim 4, wherein said means for providing an extra length comprises a means for locking the sheathing and the fibre bundle axially immovably together and cooling means for shrinking the sheathing axially with respect to the fibre bundle, the apparatus further including twisting means positioned in front of the locking means, said twisting means twisting the fibre bundle and the axially movable sheathing around its axis.

9. The apparatus according to any one of claims 4 to 8, wherein the transferring means are arranged to twist the secondary sheathing together with its fibre bundle always in the same direction.

* * * * *